United States Patent
Inariba

[15] 3,693,034
[45] Sept. 19, 1972

[54] PULSE MOTOR ASSEMBLY
[72] Inventor: Tokuzo Inariba, Tokyo, Japan
[73] Assignee: Kabushiki Kaisha Tokai Rika Denki Seisakusho, Nishibiwajima-cho, Nishikasugai-gun, Aichi Prefecture, Japan
[22] Filed: April 6, 1971
[21] Appl. No.: 131,760

[30] Foreign Application Priority Data
April 7, 1970 Japan.................45/29214

[52] U.S. Cl..................................310/49, 310/112
[51] Int. Cl...................................H02k 37/00
[58] Field of Search............310/49, 49 A, 162–164, 310/112

[56] References Cited
UNITED STATES PATENTS
3,348,083   10/1967   Inariba...................310/164
3,549,918   12/1970   Croymans et al......310/112 X Primary Examiner—D. F. Duggan
Attorney—Woodhams, Blanchard and Flynn

[57] ABSTRACT

A pulse motor assembly comprising a plurality of synchronous motors connected in tandem. Each of the synchronous motors includes a rotor having pole teeth each tapering towards its free end which is formed as a sharp pointed end. The north and south poles of permanent magnet stator included in the respective synchronous motors are staggered from each other by a distance equivalent to one pole pitch divided by the number of the synchronous motors connected.

5 Claims, 11 Drawing Figures

INVENTOR
TOKUZO INARIBA

BY Wortham, Blanchard & Flynn
ATTORNEYS (a)

(b)

FIG.6
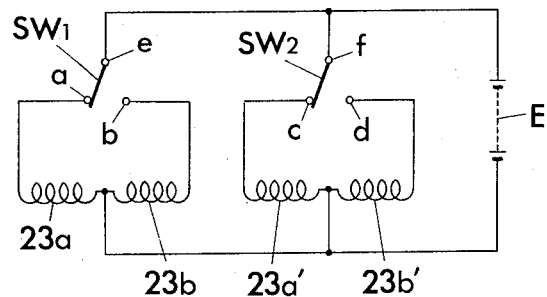
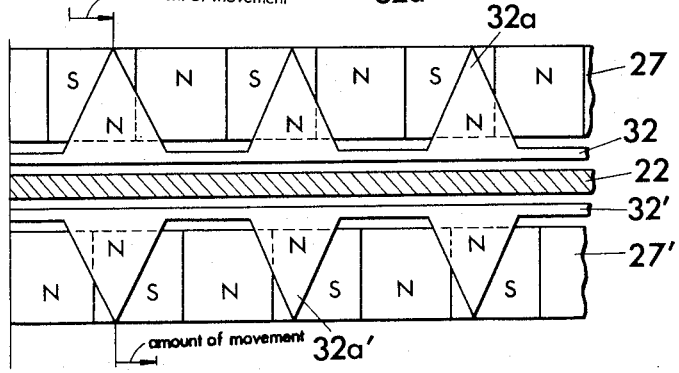
FIG. 7a
FIG. 7b

INVENTOR
TOKUZO INARIBA
BY *Woodhams Blanchard & Flynn*
ATTORNEYS

PULSE MOTOR ASSEMBLY

This invention relates to a pulse motor assembly comprising two or more synchronous motors connected in tandem and stepped by a predetermined angle at a time by reversing pulses of opposite polarities.

Unlike an induction motor, a pulse motor does not continuously rotate at a constant speed but it repeats start, acceleration, and halt every input pulse. Therefore, an output torque and moment of inertia should be carefully taken account of. Since a rotor of a conventional motor is made of a permanent magnet which presents a high load moment, hunting (a phenomena wherein the number of input pulses is not proportional to the number of steps of an output shaft) is possibly observed or start characteristic is deteriorated when such a rotor is employed in a pulse motor. Further, such a conventional motor has disadvantages that it gets so hot that a fan is required for cooling. Accordingly, the design and manufacturing process of the motor are much complicated, resulting in low efficiency of the motor for power dissipation.

It is, therefore, an object of the present invention to eliminate the above-mentioned disadvantages and to provide an improved pulse motor assembly capable of minimizing an inertia of rotor and improving a step response enough to prevent a possible hunting and a start failure.

It is another object of the present invention to provide a pulse motor assembly which is capable of employing a semiconductor circuit because of its minimized temperature rise as compared to the pulse motor assembly of the prior art, and which is capable of providing a high efficiency for low power dissipation.

It is a further object of the present invention to provide a pulse motor assembly in which a rotor has pole teeth tapered from their base portions towards their free ends to form sharp-pointed ends so that magnetic resistance is gradually increased towards their free ends, whereby alternating magnetic fluxes can be distributed desirably to increase output torque and efficiency to provide large rotating power by a small input.

Other objects of this invention will be obvious from the contents of the specification hereinafter disclosed.

Essentially according to the present invention, there is provided a pulse motor assembly comprising a casing; a partition provided in said casing to form rooms in cooperation with the casing; a rotary shaft made of non-magnetic material and rotatably supported by said casing, and a plurality of synchronous motors mounted in the respective rooms formed by said partition and each including a multiphase exciting coil, a permanent magnet stator disposed concentrically with said exciting coil and magnetized to provide north and south poles alternating on the periphery thereof, and a rotor fixed to said rotary shaft and having a plurality of pole teeth each tapered from its base portion towards its free end and disposed between said exciting coil and said permanent magnet stator, said north and south poles of the permanent magnet stators included in the respective synchronous motors being staggered from each other by a distance equivalent to one pole pitch divided by the number of the synchronous motors mounted.

The invention will be better understood from the following description taken in connection with the accompanying drawings in which.

Figure 1:
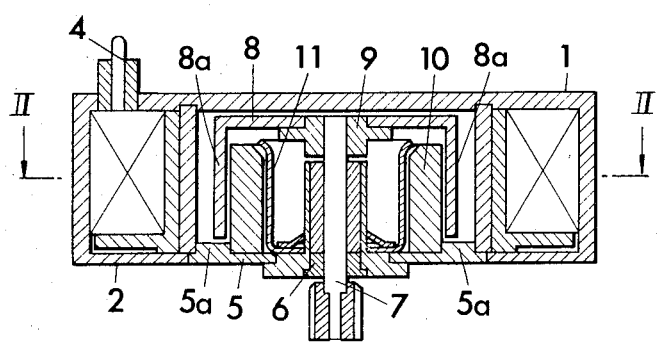
FIG. 1 is a longitudinal cross sectional view of a synchronous motor used in a pulse motor assembly according to the present invention.
Figure 3:
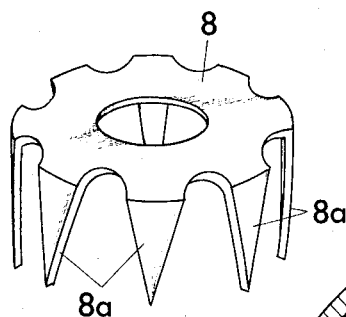
FIG. 3 is a perspective view of a rotor.
Figure 2:
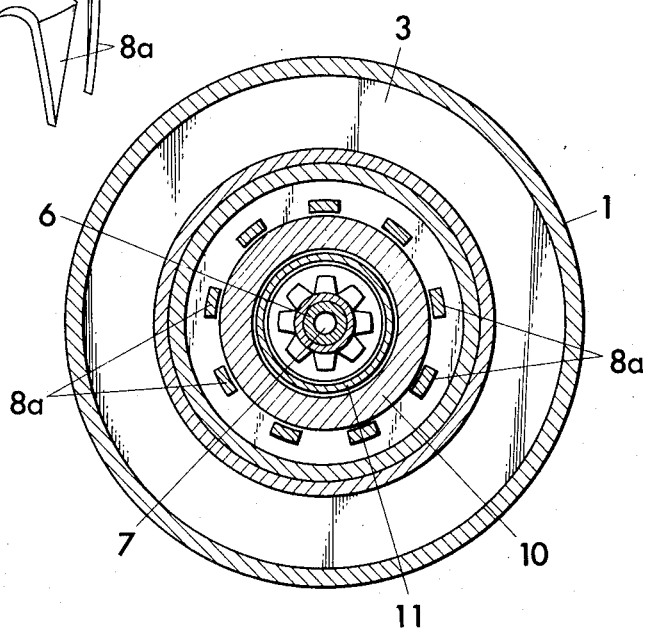
FIG. 2 is a cross sectional view taken along line II—II of FIG. 1.
Figure 4:
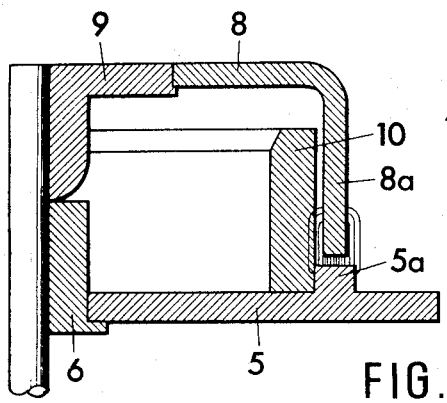
Figure 4:
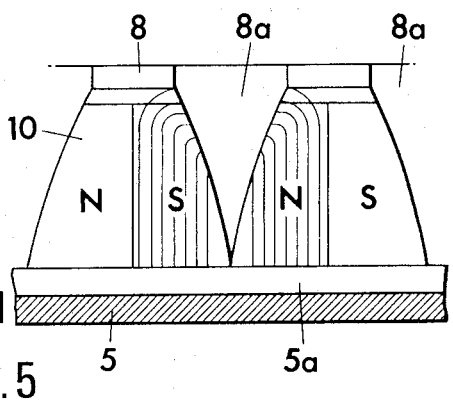
Figure 5:
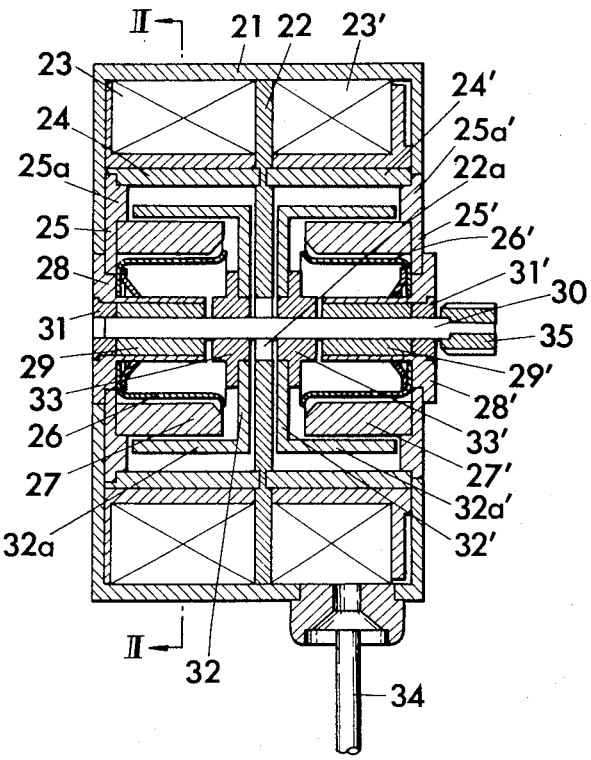

FIGS. 4(*a*) and (*b*) are explanatory sectional view showing the distribution of magnetic flux about pole teeth of the rotor and a permanent magnet;

FIG. 5 is a longitudinal cross sectional view illustrating a preferred embodiment of a pulse motor assembly according to the present invention;

FIG. 6 is a circuit diagram of an exciting coil; and

FIGS. 7(*a*) through (*e*) are explanatory development view showing the operational principle of the pulse motor assembly as shown in FIG. 5.

Referring now to FIGS. 1 through 4 which illustrate a synchronous motor used in a pulse motor of this invention, numeral 1 designates a casing of soft magnetic material which serves as a yoke of alternating magnetic circuit and has a base portion 2. Fixedly secured to said casing is an exciting coil 3 having a terminal 4 which, in turn, is to be connected to an A.C. power supply. Secured at the center of the base portion 2 is a magnet receptacle 5 of soft magnetic material having an annular projection 5a. An oil-impregnated bearing 6 is secured to said magnet receptacle 5. Rotatably supported by said bearing 6 is a rotary shaft 7 of non-magnetic material, to which fixedly secured at its upper end through a boss 9 is a rotor 8 having a plurality of pole teeth 8a each tapered in its width from its base portion toward its free end. Inside said annular projection 5a of the magnet receptacle 5 there is mounted a cylindrical permanent magnet stator 10 of ferrite magnetic material magnetized to provide north and south poles alternating on the periphery thereof. The number of poles of the magnet stator 10 is even multiple of the number of pole teeth 8a of the rotor 8. The magnet stator 10 is firmly held by a magnet holder 11 fixed to the bearing 6.

In operation, when an A.C. voltage is applied to the exciting coil through the terminal 4, an alternating magnetic field is produced in the casing 1 and the pole teeth 8a of the rotor 8 are all magnetized alternately in north and south poles in synchronism with the frequency of the power supply, causing attracting or repelling force between said poles teeth 8a of the rotor 8 and the poles of the magnet stator 10, whereby the rotor is rotated in synchronism with the frequency of said A.C. power supply. Since the annular projection 5a formed on the magnet receptacle 5 of soft magnetic material is arranged so as to face said pole teeth 8a of the rotor 8 and abut on the magnet stator 10, the magnetic fluxes of the alternating magnetic field generated by the exciting coil are effectively interlinked with a magnetic fluxes produced by said magnet stator 10.

The magnetic flux density in the pole teeth 8a of the rotor 8 is highest at their tip ends and the magnetic resistance thereof is largest also at their tip ends because magnetic fluxes are, as shown in FIGS. 4(*a*) and (*b*), leaked from the base portions of said pole teeth 8a owing to their triangular shape. Said magnetic fluxes are distributed over the substantial lengths of the pole teeth 8a to be effectively interlinked with the magnetic flux generated by the magnet stator 10, applying large attracting or repelling forces to the pole teeth 8a and resultantly applying a sufficient torque to the rotor 8. Thus, the efficiency of the motor is remarkably improved and a possible temperature rise is by far reduced.

Referring now to FIGS. 5 to 7, there is illustrated a pulse motor assembly according to the present invention which comprises two or more synchronous motors connected in tandem as shown in FIG. 5. Stated illustratively, a partition 22 in the form of a soft magnetic material plate is provided in a casing 21 at its intermediate portion to form two rooms in cooperation with said casing, in each of which a synchronous motor of the type described above is mounted. Exciting coils 23, 23' are secured to said casing 21 through locking rings 24, 24'. Each of the coils 23, 23' has a bobin on which two or more windings are wound. The exciting coil employed in the illustrated embodiment is a two phase coil having two windings.

A magnet receptacle 25 is attached to the inner surface of the back of the casing 21 and a similar magnet receptacle 25' is attached to the casing 21 around its opening. Secured to inner peripheries of annular projections 25a, 25a' formed on the magnet receptacle 25, 25', through magnet holders 26, 26', are magnet stators 27, 27', which are staggered from each other by one half of the pitch of the pole width, as shown in FIG. 7.

A bearing holder 28 is fixed on the back side of the casing 21 and another bearing holder 28' is fixed to the magnet receptacle 25'. Fitted to said bearing holders 28, 28' are oil-impregnated bearings 29, 29' by which a rotary shaft 30 of non-magnetic material is rotatably supported. Mounted on the opposite ends of the rotary shaft 30 are shaft supports 31, 31' which minimize a lateral movement of the shaft 30. Secured to the rotary shaft 30 through bosses 33, 33' are rotors 32, 32' having pole teeth 32a, 32a' each tapered from its base portion towards its free end which is formed as sharp-pointed end. Numeral 34 designates a terminal for the exciting coils 23, 23', and numeral 35 designates a pinion gear secured to the rotary shaft 30.

Referring particularly now to FIG. 6, a circuit diagram of the exciting coils 23, 23' which have bobbins on which two windings 23a, 23b and 23a', 23b' are wound, respectively. One end of each of the windings 23a, 23b is connected to fixed contacts a, b of a switch SW$_1$, respectively, while the other end of each of said windings is interconnected with each other. Similarly, one end of each of the windings 23a', 23b' is connected to fixed contacts c, d of a switch SW$_2$, respectively, while the other end of each of said windings is interconnected with each other. Movable contacts e, f of the switches SW$_1$ and SW$_2$ are connected to a positive terminal of a power supply E while the junctions of the windings 23a and 23b and the windings 23a' and 23b' are connected to a negative terminal of said power supply E. By the actuation of the switches SW$_1$, SW$_2$, pulse signals are applied to the windings 23a, 23b, 23a' and 23b'. Although a mechanical switching means is shown in the illustrated embodiment of the present invention to generate pulse signals, a suitable electric circuit such as a flip-flop circuit may, of course, be alternatively employed to generate such pulse signals through an electrical switching operation.

Operation of the above circuit is now described. When the movable contacts e, f of said switches SW$_1$ and SW$_2$ are in the neutral positions, or, when said exciting coils 23, 23' are deenergized, said rotor 32, 32' are kept in the respective positions shown in FIG. 7(a). Stated illustratively, the pole teeth 32a of the rotor 32 are positioned at one quarter of a pole pitch apart from pole interfaces of the magnet stator 27 and the pole teeth 32a' of the rotor 32' are also positioned at a quarter of a pole pitch apart from pole interfaces of the magnet stator 27', or vice versa.

When the movable contact e of the switch SW$_1$ is connected to the fixed contact a and the movable contact f of the switch SW$_2$ to the fixed contact c, pulse signals are applied to the windings 23a, 23a' of the exciting coils 23, 23' so that the rotors 32, 32' are excited to provide a north polarity. Thus, the pole teeth 32a are moved to the right in FIG. 7 due to the attracting force caused between said pole teeth 32a and the south poles of the magnet stator 27. Simultaneously, the pole teeth 32a' are moved to the right due to the repelling force between said pole teeth 32a' and the north poles of the magnet stator 27'. Said pole teeth 32a and said pole teeth 32a' are moved until they come to the respective positions shown in FIG. 7(b) in which the pole teeth 32a are at a quarter of a pole pitch apart from the respective next north poles of the magnet stator 27 and the pole teeth 32a' are at a quarter of a pole pitch apart from the respective previous north poles of the magnet stator 27'. In this connection, it is to be noted that the pole teeth 32a, 32a' are each tapered towards its end to be formed as a sharp-pointed end, so that the flux density in each of the pole teeth increases towards its free end, providing a large rotation torque for the rotors.

Figure 7C:
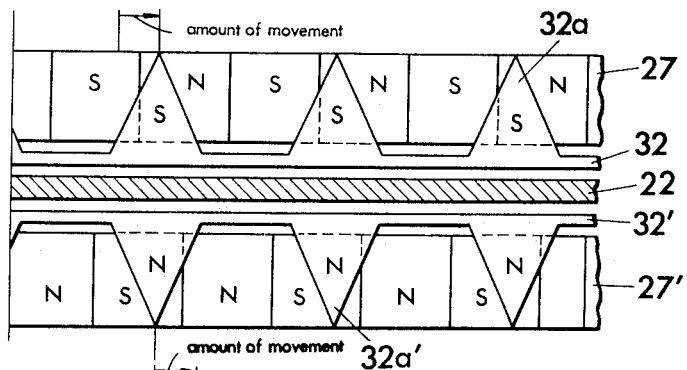

When the movable contact e of the switch SW$_1$ is connected to the fixed contact b and a pulse signal is applied to the winding 23b of the exciting coil 23, the rotor 32 is excited to provide south polarity and the pole teeth 32a are moved to the right due to the repelling force caused between said south poles of the pole teeth 32a and the south poles of the magnet stator 27. Incidentally, the pole teeth 32a' of the rotor 32' are attracted to the right, since said south poles of the magnet stator 27 have larger magnetic force at their intermediate portions, until said pole teeth 32a' of the rotor 32' are positioned as shown in FIG. 7(c) balancing with the relation between the rotor 32 and the magnet stator 27.

Figure 7D:
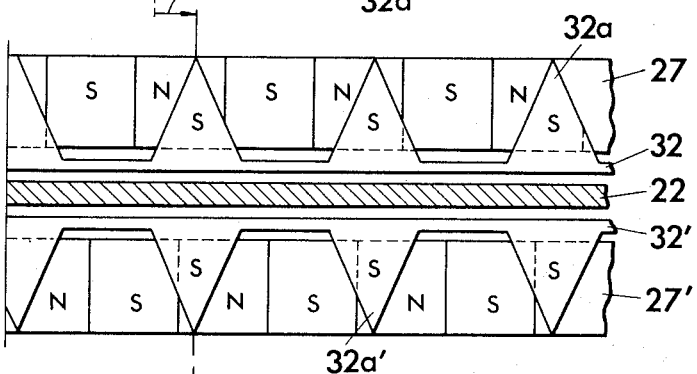
Figure 7E:
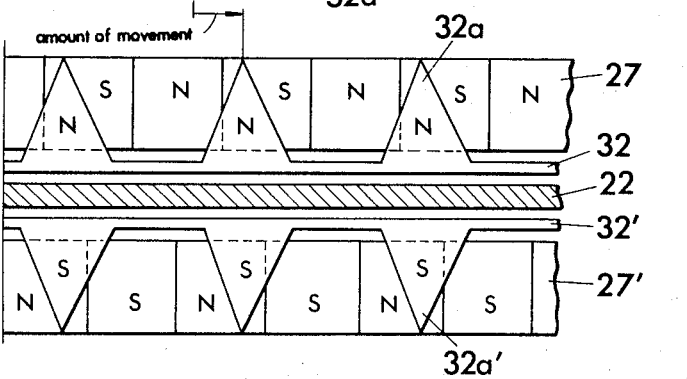

Similarly, when the movable contact f of the switch SW$_2$ is connected to the fixed contact d, the winding 23b' of the exciting coil 23' is excited to magnetize the rotor 32 in south polarity. Thus, the rotors 32, 32' are moved to the respective positions as shown in FIG. 7(d). When the movable contact e of the switch SW$_1$ is connected to the fixed contact a, the winding 23a of the exciting coil 23 is energized to magnetize the rotor 32 in north polarity, Thus, the rotors 32, 32' are moved to their respective positions as shown in FIG. 7(e). By further switching the switches SW$_1$, SW$_2$ in similar way, the rotors 32, 32' are continuously rotated. Upon actuation of the exciting coils 23, 23' in a manner as described above, the rotors 32, 32' are selectively magnetized in north or south polarities, and rotated due to the attracting or repelling force, caused between said rotors 32, 32' and the poles of the magnet stators 27, 27'. Thus, the amount of rotation is proportional to the number of input pulses. It should be understood that the rotation of the rotors 32, 32' may be reversed by operating, the switches in a reversed sequence. Although mechanical switching means are employed in the present embodiment, an electric circuit such as a flip-flop circuit may alternatively be used to effect high speed electrical switching operation. Two synchronous motors connected in tandem are employed in the present embodiment, the number of the synchronous motors is not limited to this specified number. In any case, the poles of the magnet stators 27, 27' should be staggered from each other by a distance equivalent to one pole pitch divided by the number of the synchronous motors employed. Furthermore, though the exciting coils 23, 23' are arranged outside of the stator magnets 27, 27' in the present embodiment, the stator magnets 27, 27' may be disposed outside of the exciting coils 23, 23' to accomplish the purpose.

As apparent from the foregoing descriptions, according to a pulse motor assembly of the present invention, which comprises a plurality of synchronous motors connected in tandem each having a rotor of soft magnetic material mounted between a multiphase exciting coil having a plurality of windings and a magnet stator magnetized to provide north and south poles alternating on its periphery, said rotor being magnetized alternately in north and south poles in synchronism with a pulse signal applied to said exciting coil to cause an attracting or repelling force between said rotor and the magnet stator for rotating said rotor, the mass of the rotor may be by far reduced as compared with a permanent magnet motor of a conventional pulse motor made of ferromagnetic material such as ferrite to provide an excellent pulse rotor of small inertia and quick response to a pulse signal which is applicable to a power source for digital-controlled output device or a servo-mechanism for machine tools or general industrial machine. Further according to the present invention, the pole teeth of the rotor are tapered towards their free ends which are formed as sharp-pointed ends so that alternating magnetic fluxes are distributed over their entire lengths to effectively interlink with magnetic fluxes produced by the magnet stator to provide large attracting and repelling forces for the pole teeth, thus applying a large rotating torque to the rotor and enhancing the efficiency of the motor. On the other hand, a possible temperature rise in the motor is effectively prevented to eliminate a necessity of employing a cooling fan and enable the motor to be mounted with a semiconductor circuit assembly.

It is intended that all matter contained in the foregoing description and in the drawings shall be interpreted as illustrative only not as limitative of the invention.

What is claimed is:

1. A pulse motor assembly comprising:
a casing;
a partition of soft magnetic material provided in said casing to form magnetically shielded rooms in cooperation with the casing;
a rotary shaft made of non-magnetic material and rotatably supported by said casing, and
a plurality of synchronous motors mounted in the respective rooms formed by said partition and each including a multiphase exciting coil, a permanent magnet stator disposed concentrically with said exciting coil and magnetized to provide north and south poles alternating on the periphery thereof, and a rotor fixed to said rotary shaft and having a plurality of pole teeth each tapered from its base portion towards its free end and disposed between said exciting coil and said permanent magnet stator,
said north and south poles of the permanent magnet stators included in the respective synchronous motors being staggered from each other by a distance equivalent to one pole pitch divided by the number of the synchronous motors mounted.

2. The device of claim 1 in which said casing includes an axially extending peripheral wall of soft magnetic material and a pair of end walls, said plurality of synchronous motors being axially spaced along and within said casing with one in each said room, said partition comprising a single soft magnetic material plate extending in radially overlapping relation with the rotors of two adjacent motors, said rotors of said adjacent motors being separated by said plate, said plate extending radially into contact with said casing peripheral wall, each said adjacent motor having an alternately magnetic circuit including the same plate.

3. The device of claim 2 including a pair of coaxial locking rings extending fixedly and coaxially from opposite sides of said plate into adjacent rooms, said rotor teeth in said adjacent rooms being spaced radially between said locking rings and said permanent magnet stator.

4. The device of claim 3 in which the two motors in the two rooms separated by said plate are arranged in mirror imaged, back to back relation, said plate being located in axially centered but spaced opposed relation to the permanent magnet stators of said two motors and separated therefrom by radial portions of the two rotors of said two motors, the pole teeth of said two rotors extending away from said plate.

5. The device of claim 2 in which two coils are provided for each stator and set of pole teeth and including switch means for actuating said two coils alternatively so that one is energized while the other is deenergized, all pole teeth of a given synchronous motor being energized by said multiphase exciting coil with the same magnetic polarity.

* * * * *